United States Patent
Terao et al.

(10) Patent No.: US 12,403,761 B2
(45) Date of Patent: Sep. 2, 2025

(54) LEFT-RIGHT WHEEL DRIVE DEVICE

(71) Applicants: MITSUBISHI JIDOSHA KOGYO KABUSHIKI KAISHA, Tokyo (JP); AISIN CORPORATION, Kariya (JP)

(72) Inventors: Kiminobu Terao, Tokyo (JP); Naoki Takahashi, Tokyo (JP); Toshihisa Mizutani, Kariya (JP); Taiki Owari, Kariya (JP)

(73) Assignees: MITSUBISHI JIDOSHA KOGYO KABUSHIKI KAISHA, Tokyo (JP); AISIN CORPORATOIN, Kariya (JP)

( * ) Notice: Subject to any disclaimer, the term of this patent is extended or adjusted under 35 U.S.C. 154(b) by 0 days.

(21) Appl. No.: 18/727,553

(22) PCT Filed: Dec. 7, 2022

(86) PCT No.: PCT/JP2022/045141
§ 371 (c)(1),
(2) Date: Jul. 9, 2024

(87) PCT Pub. No.: WO2023/145267
PCT Pub. Date: Aug. 3, 2023

(65) Prior Publication Data
US 2025/0074186 A1    Mar. 6, 2025

(30) Foreign Application Priority Data
Jan. 28, 2022    (JP) ................................ 2022-011499

(51) Int. Cl.
*B60K 17/04*    (2006.01)
*B60K 1/02*    (2006.01)
(Continued)

(52) U.S. Cl.
CPC ............ *B60K 17/16* (2013.01); *B60K 7/0007* (2013.01); *B60K 17/046* (2013.01); *F16H 48/05* (2013.01);
(Continued)

(58) Field of Classification Search
CPC .... B60K 17/16; B60K 17/046; B60K 7/0007; B60K 2007/0061; B60K 1/02; F16H 57/021; F16H 48/05–11
See application file for complete search history.

(56) References Cited

U.S. PATENT DOCUMENTS

2020/0284338 A1* 9/2020 Suyama ................. B60L 15/20
2022/0290749 A1* 9/2022 Mizutani ................. B60K 1/02

FOREIGN PATENT DOCUMENTS

JP    H11243664 A  *  9/1999  ........... B60K 17/356
JP    2018028365 A  *  2/2018  ............. F16H 48/10
(Continued)

OTHER PUBLICATIONS

International Search Report (PCT/ISA/210) issued in PCT/JP2022/045141, dated Feb. 7, 2023.
(Continued)

*Primary Examiner* — Tinh Dang
(74) *Attorney, Agent, or Firm* — Birch, Stewart, Kolasch & Birch, LLP

(57) ABSTRACT

In a left-right wheel drive device (10) that accommodates, in a casing (4), two electric motors (1, 2) spaced apart from each other and a planetary gear mechanism (3) arranged so as to be offset on a first side in an axial direction, a pair of motor shafts (11), a pair of counter shafts (12), and two output shafts (13, 14) are arranged in parallel. The first output shaft (13) is arranged on the first side from the planetary gear mechanism (3) and is fixed with a carrier (3C) at an end portion of a second side thereof. The second output shaft (14) is longer than the first output shaft (13) and is fixed with the second sun gear (3S2) at an end portion on the first side thereof. The second output shaft (14) is rotatably supported by roller bearings (35, 36) at the end portion on
(Continued)

the second side and a position on the second side from a driven gear meshing with the second counter gear.

5 Claims, 4 Drawing Sheets

(51) Int. Cl.
*B60K 7/00* (2006.01)
*B60K 17/16* (2006.01)
*F16H 48/05* (2012.01)
*F16H 48/06* (2006.01)
*F16H 57/021* (2012.01)

(52) U.S. Cl.
CPC .......... *F16H 48/06* (2013.01); *F16H 57/021* (2013.01); *B60K 1/02* (2013.01); *B60K 2007/0061* (2013.01)

(56) References Cited

FOREIGN PATENT DOCUMENTS

| JP | 2018155310 A | * | 10/2018 | ............. Y02T 10/64 |
| JP | 2021055772 A | * | 4/2021 | ........... F16H 57/021 |
| WO | WO-2020179202 A1 | * | 9/2020 | ............... B60K 1/02 |
| WO | WO 2021/039966 A1 | | 3/2021 | |

OTHER PUBLICATIONS

English translation of International Preliminary Report on Patentability and Written Opinion of the International Searching Authority for International Application No. PCT/JP2022/045141, dated Feb. 7, 2023.

\* cited by examiner

LEFT-RIGHT WHEEL DRIVE DEVICE

TECHNICAL FIELD

The present invention relates to a left-right wheel drive device that accommodates, in a casing, two electric motors that drive a vehicle and a planetary gear mechanism that amplifies a torque difference between the two electric motors and transmits torques to left and right wheels.

BACKGROUND TECHNIQUE

Conventionally, a vehicle has been known which is provided with a drive device including a planetary gear mechanism that, when driving torques from two independent electric motors (hereinafter also referred to as "motors") are transmitted to left and right driving wheels, amplifies a difference (torque difference) between the two driving torques and transmits the amplified torques. The presence of such a planetary gear mechanism brings an advantage that can provide a large torque difference to the left and right wheels but also a disadvantage that increases the size of the overall drive device. As a solution to the above, a technique has been proposed which suppresses an increase of the size in the radial direction of the drive device by arranging the planetary gear mechanism such that the arrangement region in the axis direction of the planetary gear mechanism overlaps that of one of the two motors (see, for example, Patent Document 1).

PRIOR ART REFERENCE

Patent Document

[Patent Document 1] WO2021/039966

SUMMARY OF INVENTION

Problems to be Solved by Invention

Offsetting the planetary gear mechanism on one side in the axis direction in a casing of the drive device as the above Patent Document 1 makes one of the left and right output shafts connected to an output element of the planetary gear mechanism which one is located on the other side in the axis direction longer than the other output shaft located on the one side. For example, FIG. 6 of Patent Document 1 discloses a configuration in which a left end portion of a long second output member (output shaft) on the left side in the drawing is supported by a ball bearing, but does not disclose a supporting structure on one end side of the second output member.

The space around the one end side of the second output member is narrow because a second coupling member and a second coupling shaft are arranged. For the above, it is conceivable that the one end side of the second output member is rotatably supported by a slide baring (metal), which can be arranged in a narrow space. However, if the support structures on both end sides of the second output member are made different from each other, a friction difference occurs due to a difference in the supporting structure. Such a friction difference generates a difference in the transfer ratio between the left and right output shafts, which leads to a difference in the left and right turning properties.

With the foregoing problems in view, one of the objects of the present invention is to ensure the stability in running straight and the equality in turning left and right without generating a friction difference between two supporting portions on a long output shaft in a left-right wheel drive device that accommodates, in a casing, two electric motors and a planetary gear mechanism. In addition to the above object, an advantageous effect that is derived from each configuration shown in the following detailed modes to carry out the present invention and which is not obtained by the conventional technique can be regarded as another object of the present disclosure.

Means to Solve Problems of Invention

The disclosed left-right wheel drive device can be implemented as an embodiment or application example disclosed below, and solves at least a part of the above problem.

The disclosed left-right wheel drive device is one that accommodates, in a casing, two electric motors that drive a vehicle and a planetary gear mechanism that amplifies a torque difference between the two electric motors and transmits torques to left and right wheels of the vehicle. The two electric motors are spaced apart from each other, and are arranged such that the rotating shafts thereof are on a same axial center. The planetary gear mechanism includes a first sun gear for inputting, a second sun gear for outputting, a carrier for outputting, pinion gears, and a ring gear for inputting, is arranged on an axial center in parallel with and different from the rotating shafts, and is arranged so as to be offset on a first side in an axial direction in the casing.

The left-right wheel drive device includes: a pair of motor shafts having a same axial center as the rotating shafts of the two electric motors, being positioned between the two electric motors, and being fixed each with one of motor gears; a pair of counter shafts being arranged in parallel with the pair of motor shafts and being fixed each with one of first counter gears and one of second counter gears, the first counter gears each meshing with one of the motor gears, the second counter gears being smaller in diameter than the first counter gears; a first output shaft being arranged in parallel with the pair of motor shafts and on the first side from the planetary gear mechanism, and being fixed with the carrier at an end portion on a second side in the axial direction of the first output shaft; and a second output shaft being arranged on a same axial center as the first output shaft, being longer than the first output shaft, being fixed with the second sun gear at an end portion of the first side of the second output shaft. The second output shaft is rotatably supported by roller bearings at the end portion on the second side and a position on the second side from a driven gear meshing with the second counter gear arranged on the second side.

Effect of Invention

The disclosed left-right wheel drive device generates no friction difference between two supporting portions on a long output shaft, and therefore generates no difference in the transfer ratio between the first output shaft and the second output shaft. Consequently, it is possible to ensure the stability in running straight and the equality in turning left and right.

BRIEF DESCRIPTION OF DRAWING(S)

EMBODIMENT TO CARRY OUR INVENTION

Hereinafter, description will be made in relation to an embodiment applied with the disclosed left-right wheel drive device. The following embodiment is merely exemplary, and there is no intention to eliminate the application of various modifications and techniques not explicitly described in the following embodiment. The configurations of the following embodiment can be variously modified without departing from the scope thereof. Furthermore, the configurations can be selected or omitted according to the requirement or appropriately combined. In the following description, a direction in which a vehicle moves forward is referred to as front (vehicle front), the left and right directions are defined on the basis of the front, and the left-right direction of the vehicle is also referred to as a vehicle width direction.

1. Configuration

Figure 1:
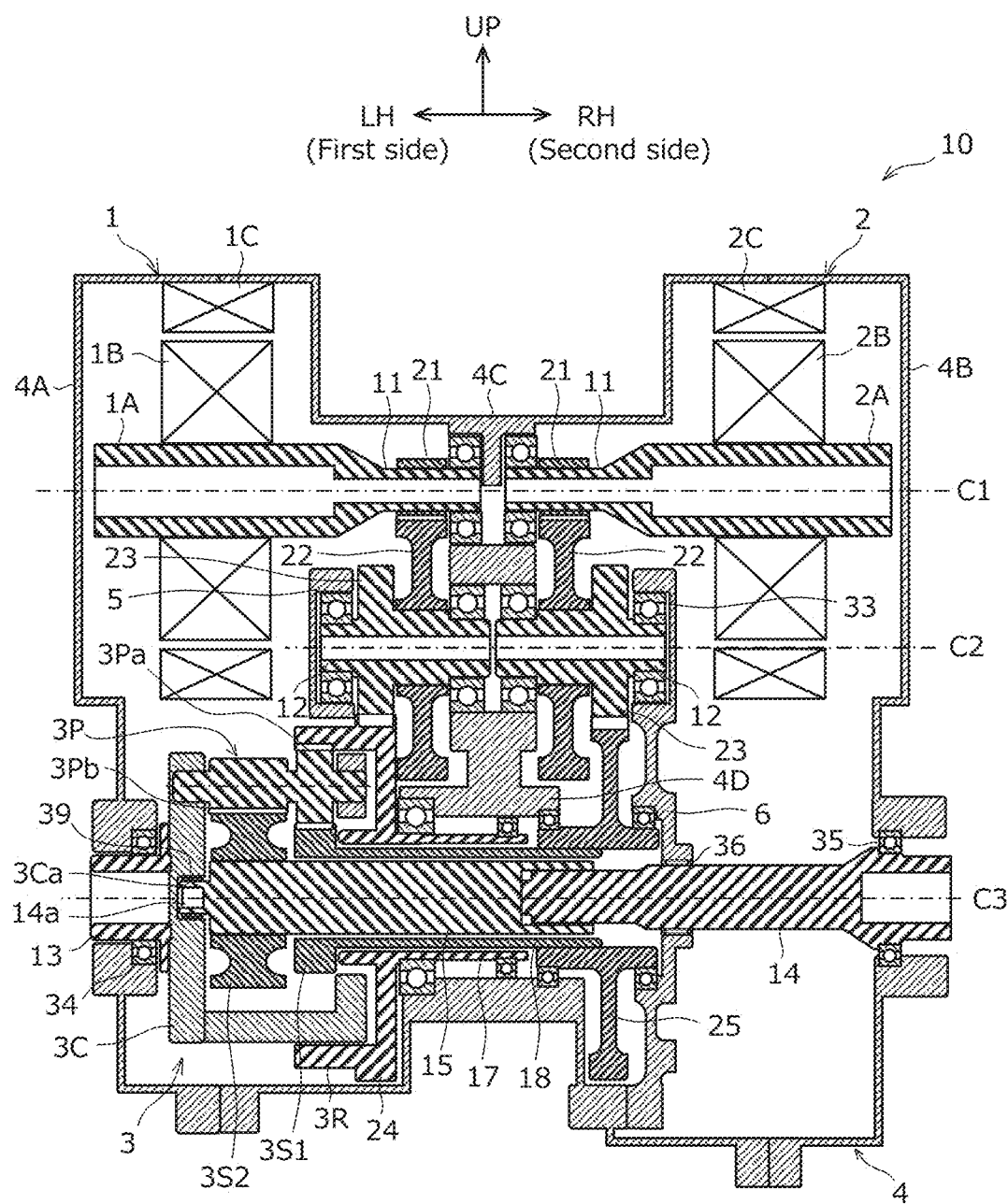
FIG. 1 is a cross sectional view showing a left-right wheel drive device according to an embodiment.
Figure 2:
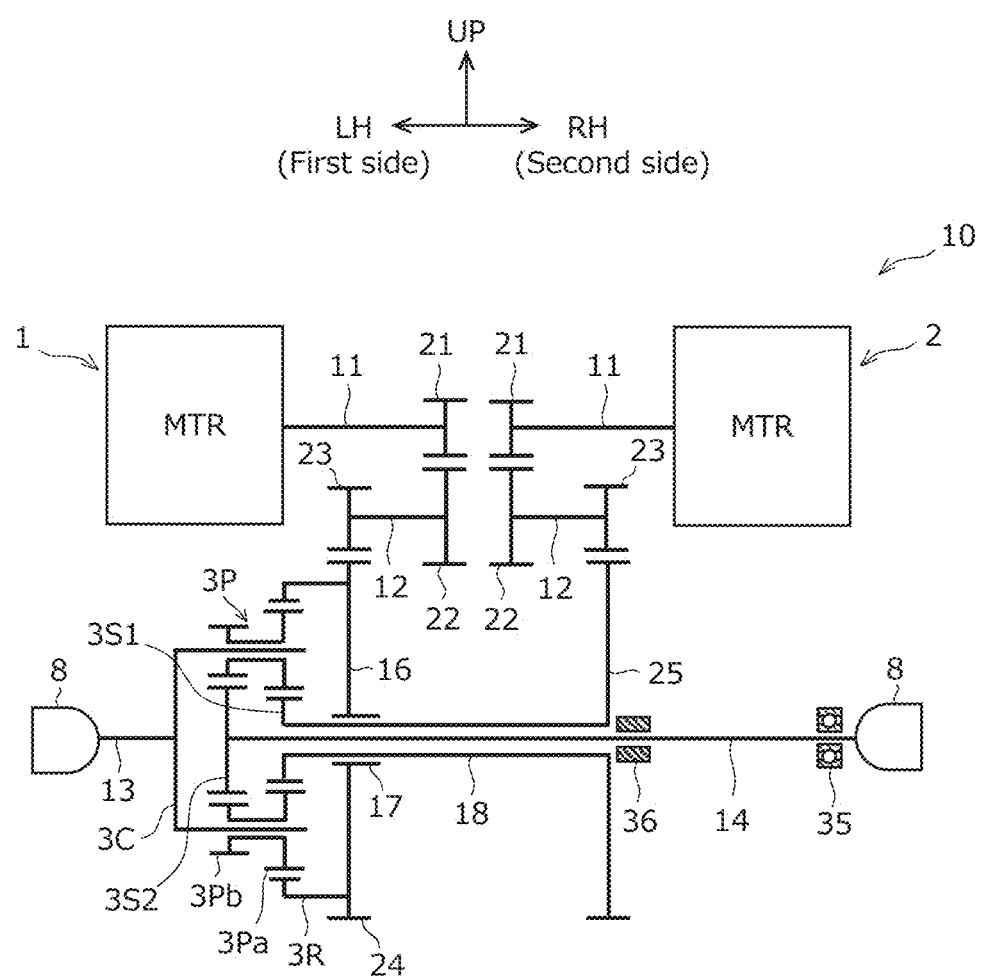
FIG. 2 is a skeleton diagram of the left-right wheel drive device of FIG. 1.

The left-right wheel drive device (hereinafter referred to as "drive device 10") of the present embodiment is shown in FIG. 1, and the skeleton diagram thereof is shown in FIG. 2. This drive device 10 is a differential device for a vehicle having an AYC (Active Yaw Control) function and is interposed between the left and right wheels. The AYC function adjusts the magnitude of the yaw moment by controlling the share ratio of the driving forces (driving torques) on the left and right driving wheels independently, and thereby stabilizes the attitude in the yaw direction of the vehicle. Besides the AYC function, the drive device 10 of the present embodiment also has a function for transmitting the driving torque to the left and right wheels to run the vehicle and a function for passively absorbing a difference of the rotational speed between the left and right wheels generated when the vehicle is turning. Joint units 8 shown in FIG. 2 are connected to non-illustrated left and right wheels.

The drive device 10 accommodates, in a casing 4, two electric motors 1, 2 that drive two left and right wheels and a planetary gear mechanism 3 (hereinafter referred to "gear mechanism 3") that amplifies the torque difference between the two motors 1, 2 and transmits torques to the left and right wheels. One motor 1 (hereinafter referred to as a "left motor 1") is located on the left side of the vehicle and the other motor 2 (hereinafter referred to as a "right motor 2") is located on the right side of the vehicle.

The left and right motors 1, 2 are AC motors driven by electric power of a non-illustrated battery, and preferably have similar output properties. Torque of each of the left and right drive wheels is variable, and the torque difference between the left motor 1 and the right motor 2 is amplified in the gear mechanism 3 and the torques are transmitted to the left and right wheels. The drive device 10 of the present embodiment includes a reduction gear train that transmits the torques while reducing the rotational speeds of the motors 1, 2.

The left motor 1 is provided with a rotor 1B which rotates integrally with a rotating shaft 1A, and a stater 1C fixed to a first casing portion 4A. Similarly, the right motor 2 is provided with a rotor 2B which rotates integrally with a rotating shaft 2A, and a stater 2C fixed to a second casing portion 4B. The left motor 1 and the right motor 2 are arranges apart from and opposite to each other in such an attitude that both of the two rotating shafts 1A, 2A coincide with the vehicle width direction. The rotating shafts 1A, 2A are arranged on the same axial center C1 (hereinafter referred to as "first axial center C1").

The gear mechanism 3 has a function for amplifying a torque difference at a predetermined amplification ratio, and consists of, for example, a differential mechanism or a planetary gear mechanism. As shown in FIGS. 1 and 2, the gear mechanism 3 includes a first sun gear 3S1 for inputting, a second sun gear 3S2 for outputting, a carrier 3C for outputting, pinion gears 3P, and a ring gear 3R for inputting. That is, the first sun gear 3S1 and the ring gear 3R are the input elements, and the second sun gear 3S2 and the carrier 3C are the output elements.

The gear mechanism 3 are arranged on an axial center C3 (hereinafter referred to as "third axial center C3") parallel with but different from the first axial center C1 of the rotating shafts 1A, 2A, and is arranged so as to be offset to a first side in the axial direction in the casing 4. The gear mechanism 3 of the present embodiment is arranged so as to be offset to the left side of the vehicle. That is, "a first side in the axial direction" in the present embodiment corresponds to the left side of the vehicle, and the opposite side, that is, a second side in the axial direction corresponds to the right side of the vehicle. The gear mechanism 3 of the present embodiment is arranged at a position overlapping the rotor 1B and the stator 1C of the left motor 1 when viewed from a direction perpendicular to the axial direction.

The drive device 10 includes a pair of motor shafts 11 having the same axial center C1 as the rotating shafts 1A, 2A (i.e., arranged on the first axial center C1), a pair of counter shafts 12 arranged in parallel with the motor shafts 11, and two (left and right) output shafts 13, 14 arranged in parallel with the motor shafts 11 and the counter shafts 12. These motor shafts 11, the counter shafts 12, and the output shafts 13, 14 are arranged in this sequence from the upstream side of the power transmission path from the respective motors 1, 2 to the left and right wheels.

In the present embodiment, the pair of motor shafts 11 are symmetrical to each other. The motor shafts 11 are located between the left and right motors 1, 2, and is each fixed with a motor gear 21. FIG. 1 illustrates the left motor shaft 11 integrated with the rotating shaft 1A and the right motor shaft 11 integrated with the rotating shaft 2A. Alternatively, each motor shaft 11 may be separately formed from and then integrated with the corresponding one of the rotating shafts 1A, 2A.

In the present embodiment, the pair of counter shafts 12 are arranged between the left and right motors 1, 2 on a second axial center C2 parallel with the first axial center C1 and are symmetrical to each other. To each counter shaft 12, a first counter gear 22 always meshing with a corresponding motor gear 21 and having a diameter larger than that of the motor gear 21 and a second counter gear 23 having a diameter smaller than that of the first counter gear 22 are fixed. The two counter gears 22, 23 are preferably arranged close to each other, and the second counter gear 23 having a smaller diameter is arranged closer to the corresponding one of the motors 1, 2 than the first counter gear 22 having a larger diameter. The motor gear 21 and the first counter gear 22 collectively constitute the first stage of the reduction gear train. It is sufficient that the counter shaft 12 and the two counter gears 22, 23 rotate integrally, and may be integrated with one another or may be separated from one another but fixed to one another.

The two output shafts 13, 14 are arranged on the same axial center C3 and are asymmetrically to each other. Hereinafter, the output shaft 13 on the first side (left side) to which the gear mechanism 3 is offset is referred to as "first output shaft 13", and the output shaft 14 on the second side (right side) is referred to as "second output shaft 14". The first output shaft 13 is located on the first side of the gear mechanism 3, and the carrier 3C is fixed to the end portion on the other side (right end portion) of the first output shaft 13. The first output shaft 13 is rotatably supported with respect to the first casing portion 4A of the casing 4 by a roller bearing 34 (e.g., ball bearings).

The second output shaft 14 is longer than the first output shaft 13 and is located on the second side of the gear mechanism 3, and the second sun gear 3S2 is fixed to an end portion (left end portion) on the first side of the second output shaft 14. The second output shaft 14 is rotatably supported by roller bearings 35, 36 at two positions on the axial direction, as to be described below. The dimension in the axial direction of the second output shaft 14 is determined on the basis of the arrangement of the gear mechanism 3, but is at least larger than the half of the dimension in the vehicle width direction around the third axial center C3 of the drive device 10. Therefore, as shown in FIG. 1, the second output shaft 14 may be formed by being spline-coupled with the middle shaft 15 arranged on the same axial center C3. This configuration enhances the assemblability of the second output shaft 14.

Description will now be made in relation to the gear mechanism 3 of the present embodiment. In the gear mechanism 3, the torque of the left motor 1 is input into the ring gear 3R, the torque of the right motor 2 is input into the first sun gear 3S1, the torque is output from the carrier 3C to the left wheel, and the torque is output from the second sun gear 3S2 to the right wheel. The ring gear 3R is integrally provided with a first driven gear 24 which always meshes with the second counter gear 23 on the first side (left side). In the gear mechanism 3 of the present embodiment, the ring gear 3R and the first driven gear 24 are formed on the bottomed cylindrical portion 16.

Specifically, the bottomed cylindrical portion 16 is arranged on the third axial center C3 in such a posture that the opening thereof is directed to the first side (left side), a tooth unit serving as the ring gear 3R is formed at a portion close to the opening on the inner circumference surface of the bottomed cylindrical portion 16, and a tooth unit serving as the first driven gear 24 is formed at a portion close to the bottom on the outer circumference surface of the bottomed cylindrical portion 16. A small-diameter cylindrical portion 17 is integrally provided through the bottom face of the bottomed cylindrical portion 16, and the cylindrical portion 17 is rotatably supported with respect to a center casing portion 4C of the casing 4.

On the inside in the radial direction of the ring gear 3R, the first sun gear 3S1 that rotates around the third axis center C3 and a large-diameter portion 3Pa of the pinion gear 3P meshing with both the ring gear 3R and the first sun gear 3S1 are arranged. The first sun gear 3S1 is arranged so as to extend in the axial direction toward the second side and is also integrated with a hollow shaft portion 18 inside of which the second output shaft 14 is inserted. At the end portion on the first side of the hollow shaft portion 18, the first sun gear 3S1 is disposed, and with the end portion on the second side of the hollow shaft portion 18, a hub of a second driven gear 25 that always meshes with the second counter gear 23 arranged on the second side (right side) is spline-coupled. That is, the first sun gear 3S1 and the second driven gear 25 rotate integrally.

The inner circumference surface of the hollow shaft portion 18 and the outer circumference surface of the second output shaft 14 are out of contact with each other, and a gap is formed between the circumference surfaces. Similarly, the outer circumference surface of the hollow shaft portion 18 and the inner circumference surface of the cylindrical portion 17 are out of contact with each other, and a gap is formed between the circumference surfaces. Oil can enter these gaps. The second counter gear 23 and the first driven gear 24 on the first side and the second counter gear 23 and the second driven gear 25 on the second side collectively constitute the second stage of the reduction gear train. The above gears 21 to 25 are positioned on power transmission paths from the right and left motors 1, 2 to the left and right wheels.

The pinion gear 3P includes the above large-diameter portion 3Pa and a small-diameter portion 3Pb arranged on the first side of the large-diameter portion 3Pa, and is rotatably supported with respect to the carrier 3C. The second sun gear 3S2 is arranged close to and on the first side (left side) of the first sun gear 3S1 and always meshes with the small-diameter portion 3Pb of the pinion gear 3P. The carrier 3C includes a disc portion concentric with the third axial center C3 and arranged on the first side of the second sun gear 3S2. The first output shaft 13 is fixed to the disc portion of the carrier 3C. The first output shaft 13 and the disc portion of the carrier 3C may be integrated.

Next, description will now be made in relation to the casing 4. As shown in FIG. 1, in the drive device 10 of the present embodiment, the casing 4 consists of three components. Specifically, the casing 4 is formed by combining the first casing portion 4A covering the first side of the left motor 1 and the first side of the gear mechanism 3, the second casing portion 4B covering the second side of the right motor 2, and the center casing portion 4C disposed between the two casing portions 4A, 4B. The neighboring casing portions 4A and 4C and the neighboring casing portions 4B and 4C are fixed to each other by non-illustrated fasteners.

The center casing portion 4C has a partition wall 4D that partitions the inside of the casing 4 into left and right spaces. On the partition wall 4D, bearings that rotatably support, for example, the motor shafts 11 and the counter shafts 12 are fixed, and a through hole through which, for example, the second output shaft 14 and the hollow shaft portion 18 are inserted is formed. The configuration of the casing 4 is exemplary, and is not limited to that illustrated in FIG. 1. Alternatively, the casing 4 may consist of two components, or a combination of four or more components.

The drive device 10 of the present embodiment includes two supporting members 5, 6 that are fixed to the casing 4 in the casing 4. Each of the supporting members 5, 6 is a component in the form of a flat plate, and is fixed to the casing 4 with a non-illustrated fastener so as to extend in a direction perpendicular to the axial direction. The first supporting member 5 arranged on the first side is arranged at a position overlapping the bottomed cylindrical portion 16 when viewed from a direction perpendicular to the axial direction, and is arranged on the second side from the rotor 1B and the stator 1C of the left motor 1. A bearing that supports one end portion of the counter shaft 12 arranged on the first side is fixed to the first supporting member 5.

The second supporting member 6 arranged on the second side is arranged on the second side from the second driven gear 25 and on the first side from the rotor 2B and the stator 2C of the right motor 2. To the second supporting member 6, at least a bearing 33 that supports the other end portion of the counter shaft 12 arranged on the second side and a bearing that supports the hub of the second driven gear 25 are fixed.

Figure 3:
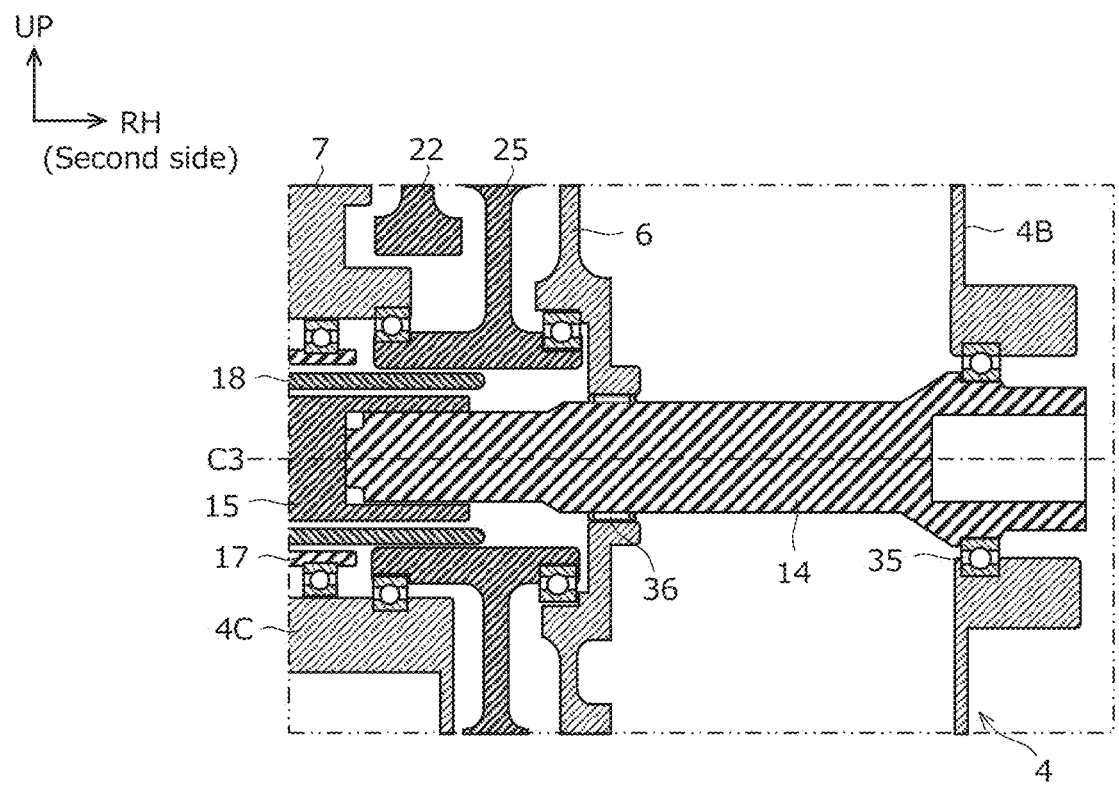
FIG. 3 is an enlarged view of a principle part of the left-right wheel drive device of FIG. 1.

Next, description will now be made in relation to a supporting structure of the second output shaft 14. As shown in FIGS. 1 to 3, the second output shaft 14 is rotatably supported at the end portion (right end portion) on the second side with respect to the second casing portion 4B of the casing 4 by a ball bearing serving as the roller bearing 35. The second output shaft 14 is further rotatably supported at a position on the second side from the second driven gear 25 with respect to the second supporting member 6 fixed to the casing 4 by a needle bearing serving as the roller bearing 36. The roller bearing 36 is fixed to a hole portion penetrating the second supporting member 6.

The space on the first side from the second driven gear 25 is narrow because cylindrical components such as the hub of the second driven gear 25, the hollow shaft portion 18, and the cylindrical portion 17 are arranged, but a relatively wide space is reserved on the second side from the second driven gear 25 because the gear mechanism 3 is arranged so as to be offset. With this structure, the roller bearing 36, which is arranged at a position facing this wide space, is supplied with sufficient oil, so that the lubricating performance is enhanced.

Figure 4:
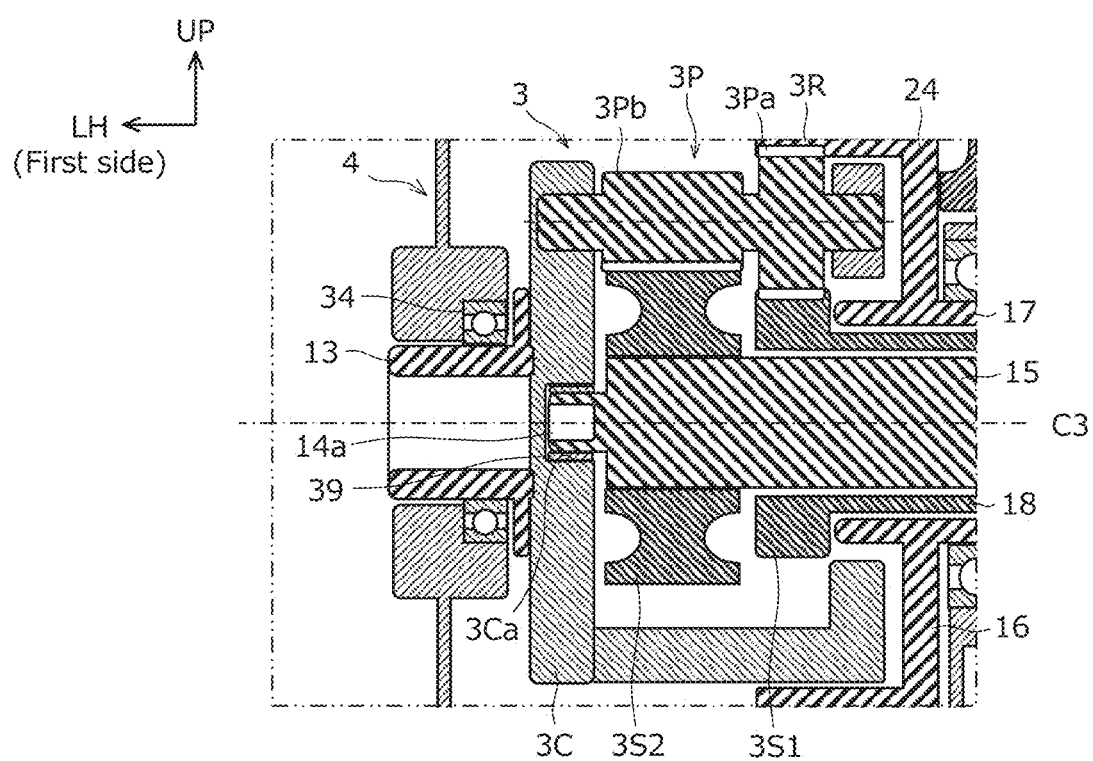
FIG. 4 is an enlarged view of a principle part of the left-right wheel drive device of FIG. 1.

In addition to the two roller bearings 35, 36 disposed at the above two positions, the second output shaft 14 of the present embodiment is further rotatably supported at the end portion on the first side. Specifically, as shown in FIGS. 1 and 4, the drive device 10 further includes a recess portion 3Ca formed by recessing a surface of the disc portion of the carrier 3C which surface is facing the second sun gear 3S2, a bush 39 fixed inside the recess portion 3Ca, and a protrusion portion 14a protruding from an end surface on the first side of the second output shaft 14 and rotatably supported with respect to the bush 39. The recess portion 3Ca is a portion that forms a cylindrical space centered on third axial center C3, and the bush 39 is fixed to the inner circumference surface of the recess portion 3Ca. An example of the bush 39 is an oilless bush. The bush 39 supports the protrusion portion 14a formed on the first side of the second output shaft 14, so that the inclination of the second output shaft 14 is suppressed.

2. Actions and Effects (1) In the above-described drive device 10, the second output shaft 14, which has been made longer by arranging the gear mechanism 3 to be offset to the first side in the axial direction, is rotatably supported by the two roller bearings 35, 36 arranged at two positions spaced apart in the axial direction. This structure generates no friction difference between the two positions as compared with, for example, a structure that supports, of two points in the axis direction, one point with a roller bearing and the other point with the metal (i.e., the supporting structures of the two positions are different). This can avoid generation of a difference in the transfer ratio between the left and right output shafts 13, 14, so that the stability in running straight and the equality in turning left and right can be ensured. Further, the roller bearing 36 faces a relatively wide space of the casing and the second supporting member because supporting the second output shaft 14 at the position on the second side from the second driven gear 25 in the second output shaft 14, so that sufficient oil can be supplied and the lubricating performance can be enhanced.

(2) According to the drive device 10 described above, since the inner circumference surface of the hollow shaft portion 18, which connects the first sun gear 3S1 to the second driven gear 25, and the outer circumference surface of the second output shaft 14 are out of contact with each other, it is possible to prevent seizure due to rotation. In addition, in a configuration that supports the second output shaft with the metal, it is difficult to supply the metal supporting portion with sufficient oil because the configuration has three axes. However, a configuration that supports the second output shaft 14 with the roller bearing 36 and reserves a gap space between the hollow shaft portion 18 and the second output shaft 14 eliminates the requirement for oil supply and therefore can eliminate a lubricating hole for ensuring the lubricating performance.

(3) Incidentally, if the middle portion in the axis direction of the second output shaft 14 is configured to be supported by the roller bearing 36 (e.g., a needle bearing) as described above and the middle shaft 15 is configured to be spline-coupled, the second sun gear 3S2 fixed to the end portion of the middle shaft 15 inclines and the meshing of the second sun gear 3S2 with the pinion gear 3P would be in a non-backlash state.

If it is impossible to ensure appropriate backlash between meshing gears, the aligning effect of the planetary less works due to the occurrence of tooth interference, which leads to wearing of the tooth surface and degrading of the strength reduction. The aligning effect of the planetary is a characteristic of a planetary gear mechanism in which reaction force is generated at each of the meshing points, the sun gear and the ring gear automatically perform center alignment by the reaction force, and automatically perform the centering until the force is balanced. If this aligning effect does not work properly, partial contact and/or uneven load on the pinion gears 3P are generated to increase inputs into the second sun gear 3S2 and/or the pinion gears 3P, resulting in lowering of the strength.

To solve this problem, as described above, the inclination of the second output shaft 14 can be avoided by the structure that provides the protrusion portion 14a on the tip of the second output shaft 14, provides the recess portion 3Ca on the carrier 3C, and rotatably supporting the protrusion portion 14a by the bush 39 in the recess portion 3Ca. As a result, since appropriate backlash can be ensured by meshing of the second sun gear 3S2 fixed to the end portion of the second output shaft 14 with the pinion gears 3P, the planetary can smoothly undergo alignment and can avoid partial contact and/or uneven meshing, so that an expected strength can be ensured.

(4) In addition, as shown in FIG. 1, if the second output shaft 14 is configured by being spline-coupled with the middle shaft 15, which means that the long second output shaft 14 is of an assembling type, the assemblability can be improved.

(5) Further, since, in the drive device 10 described above, the needle bearing serving as the roller bearing 36 is fixed to the second supporting member 6 to which the bearing 33 of the counter shaft 12 arranged on the second side is fixed, the roller bearing 36 can be arranged even in a narrow space without requiring an additional member.

3. Modification

The structure of the drive device 10 described above is an example, but is not limited to one described above. Alternatively, the fixing point of the roller bearing 36 may be a different component (e.g., a component constitutes the casing 4) from the second supporting member 6 or may be another supporting member. The type of the roller bearing 36 is not limited to a needle bearing, and the type of the roller bearing 35 is not limited to a ball bearing.

The second output shaft 14 is not spline-coupled with the middle shaft 15, but may alternatively be formed of a single shaft member. In addition, the supporting structure formed by the protrusion portion 14a at the tip of the second output shaft 14 and the recess portion 3Ca of the carrier 3C are not essential and can be omitted.

In the drive device 10 described above, the pair of motor shafts 11 and the pair of counter shafts 12 are configured to be symmetrical, but do not necessarily have to be symmetrical.

In the drive device 10 described above, the gear mechanism 3 is arranged so as to be offset to the left side of the vehicle, but the gear mechanism 3 may be arranged so as to be offset to the right side of the vehicle. In this case, since the output shaft on the second side (vehicle left side) comes to be long, it is sufficient that the above configuration is inverted with respect to the left-right direction and then applied to the alternative.

DESCRIPTION OF REFERENCE SINGS

1: left motor (electric motor)
1A: rotating shaft
2: right motor (electric motor)
2A: rotating shaft
3: gear mechanism (planetary gear mechanism)
3C: carrier
3Ca: recess portion
3P: pinion gear
3R: ring gear
3S1: first sun gear
3S2: second sun gear
4: casing
6: second supporting member (supporting member)
10: drive device (left-right wheel drive device)
11: motor shaft
12: counter shaft
13: first output shaft
14: second output shaft
14a: protrusion portion
15: middle shaft
18: hollow shaft portion
21: motor gear
22: first counter gear
23: second counter gear
24: first driven gear
25: second driven gear (driven gear)
35: roller bearing
36: roller bearing (needle bearing)
39: bush

The invention claimed is:

1. A left-right wheel drive device that accommodates, in a casing, two electric motors that drive a vehicle and a planetary gear mechanism that amplifies a torque difference between the two electric motors and transmits torques to left and right wheels of the vehicle, wherein
the two electric motors are spaced apart from each other and are arranged such that rotating shafts thereof are on a same axial center,
the planetary gear mechanism comprises a first sun gear for inputting, a second sun gear for outputting, a carrier for outputting, pinion gears, and a ring gear for inputting, is arranged on an axial center in parallel with and different from the rotating shafts, and, is arranged so as to be offset on a first side in an axial direction in the casing;
the left-right wheel drive device comprises
a pair of motor shafts having a same axial center as the rotating shafts of the two electric motors, being positioned between the two electric motors, and being fixed each with one of motor gears,
a pair of counter shafts being arranged in parallel with the pair of motor shafts and being fixed each with one of first counter gears and one of second counter gears, the first counter gears each meshing with one of the motor gears, the second counter gears being smaller in diameter than the first counter gears,
a first output shaft being arranged in parallel with the pair of motor shafts and on the first side from the planetary gear mechanism, and being fixed with the carrier at an end portion on a second side in the axial direction of the first output shaft,
a second output shaft being arranged on a same axial center as the first output shaft, being longer than the first output shaft, being fixed with the second sun gear at an end portion on the first side of the second output shaft, and
a supporting member being fixed to the casing in the casing so as to extend in a direction perpendicular to the axial direction;
the supporting member is located on the second side from a driven gear meshing with the second counter gear arranged on the second side, and is located on the first side from one of the electric motors arranged on the second side, and
the second output shaft is rotatably supported by one roller bearing at the end portion on the second side with respect to the casing, and is further rotatably supported by another roller bearing at a position on the second side from the driven gear with respect to the supporting member.

2. The left-right wheel drive device according to claim 1, wherein
the driven gear and the first sun gear are coupled to each other by a hollow shaft portion, the second output shaft being inserted through an inside of the hollow shaft portion, and
an inner circumference surface of the hollow shaft portion is out of contact with an outer circumference of the second output shaft.

3. The left-right wheel drive device according to claim 1, further comprising:
a recess portion formed by recessing a face of the carrier, the face being opposite to the second sun gear;
a bush fixed to an inside of the recess portion; and
a protrusion portion protruding from an edge face on the first side of the second output shaft and being rotatably supported by the bush.

4. The left-right wheel drive device according to claim 1, wherein
the second output shaft is formed by being spline-coupled with a middle shaft arranged on a same axial center.

5. The left-right wheel drive device according to claim 1 wherein, further comprising
the supporting member is fixed with a bearing rotatably supporting an end portion on the second side of one of the pair of counter shafts arranged on the second side, and the roller bearing at the position of the second output shaft is a needle bearing fixed to a hole portion penetrating through the supporting member.

* * * * *